Aug. 13, 1968  P. DONCHE-GAY  3,396,759
BARBED WIRE MACHINE

Filed April 19, 1966  7 Sheets-Sheet 1

INVENTOR:
PIERRE DONCHE-GAY

BY Peter L. Tailer
ATTORNEY

Aug. 13, 1968 P. DONCHE-GAY 3,396,759
BARBED WIRE MACHINE
Filed April 19, 1966 7 Sheets-Sheet 3

INVENTOR:
PIERRE DONCHE-GAY
BY Peter S. Tailer
ATTORNEY

Aug. 13, 1968     P. DONCHE-GAY     3,396,759
BARBED WIRE MACHINE Filed April 19, 1966     7 Sheets-Sheet 4

INVENTOR:
PIERRE DONCHE-GAY
BY Peter S. Tailer
ATTORNEY

Aug. 13, 1968  P. DONCHE-GAY  3,396,759
BARBED WIRE MACHINE

Filed April 19, 1966  7 Sheets-Sheet 5

INVENTOR:
PIERRE DONCHE-GAY
BY
ATTORNEY

Aug. 13, 1968    P. DONCHE-GAY    3,396,759
BARBED WIRE MACHINE

Filed April 19, 1966    7 Sheets-Sheet 6

INVENTOR:
PIERRE DONCHE-GAY
BY
Peter L. Tailer
ATTORNEY

Aug. 13, 1968  P. DONCHE-GAY  3,396,759
BARBED WIRE MACHINE
Filed April 19, 1966  7 Sheets-Sheet 7

INVENTOR:
PIERRE DONCHE-GAY
BY Peter S. Tailor
ATTORNEY

United States Patent Office 3,396,759
Patented Aug. 13, 1968

3,396,759
BARBED WIRE MACHINE
Pierre Donche-Gay, Buenos Aires, Argentina, assignor to American Engineering Company, Limited, Nassau, Bahamas
Filed Apr. 19, 1966, Ser. No. 548,342
8 Claims. (Cl. 140—58)

ABSTRACT OF THE DISCLOSURE

A single strand barb wire machine has a pair of intermittently driven wire forming rollers which flatten the main strand along its entire length except for pairs of closely spaced unflattened portions, the intermittently driven rollers constantly contacting and positioning the main strand to have barbs wound thereon between the closely spaced unflattened portions of the main strand while it is at rest.

---

This invention relates in general to machines for the manufacture of barbed wire; and, more particularly, to barbed wire machines for the manufacture of single strand barbed wire.

An object of this invention is to provide a more rugged, longer lived, easier adjusted, easier maintained, and more serviceable barbed wire machine.

Another object of this invention is to provide a single strand barbed wire machine having wire forming rollers which intermittently advance and form a main strand and positively index the position of the main strand to have barbs wound thereon at desired locations.

Still another object of this invention is to provide a single strand barbed wire machine having wire forming rollers which intermittently advance and form a main strand to have a flattened or oval cross section between sections about which barbs are wound, the sections about which barbs are wound having undeformed cylindrical ends and flattened centers, the rollers indexing and positioning the sections of the main strand to have barbs wound thereon.

A further object of this invention is to provide a single strand barbed wire machine having barb feed rollers which flatten one side of the barb wire to more closely wrap the barbs about the main strand.

Yet another object of this invention is to provide a single strand barbed wire machine having intermittently rotated wire forming rollers which advance and form a main strand and index the position of the main strand to have barbs wound thereon, the barbed wire machine having a constantly driven take-up reel and means taking up the slack in the main strand during the advance of the main strand from the rollers.

An additional object of this invention is to provide a vertically mounted and integrally assembled barb feeding, winding, and cut off unit which may be removed from a barbed wire machine as a unit for servicing or adjustment.

A still further object of this invention is to provide a rugged and readily adjustable intermittent drive for wire forming rollers of a barbed wire machine.

Many other objects, advantages, and features of invention reside in the particular construction, combination, and arrangement of parts involved in the embodiment of my invention and its practice otherwise as will be understood from the following description and accompanying drawing wherein:

Referring to the drawing in detail, FIGURES 1, 2, 5, and 15 show the general appearance of the barbed wire machine of my invention. A machine frame 1 has a base 2 with front and rear walls 3 and 4. A top 5 and end walls 6 and 7 join the front and rear walls 3 and 4. Base 2 extends beyond end wall 6 and has the recessed front wall 8, rear wall 9, and end wall 10 extend upward from it to be covered by top wall 11 and form frame extension 12. Machine frame 1 and extension 12 are particularly strong and rigid because they have a box like structure. These elements are best fabricated by welding suitably formed steel plates together.

Figure 1:
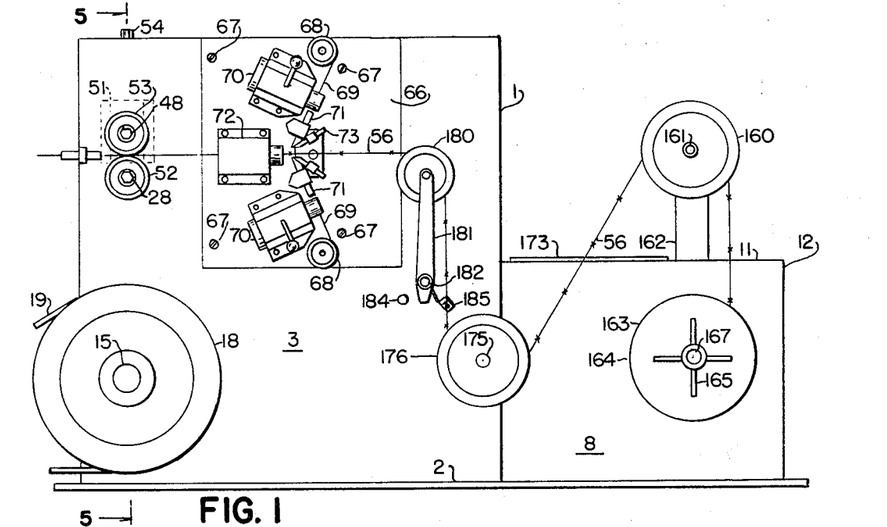
FIGURES 1 and 2 are, respectively, front and top views of a barbed wire machine according to my invention.
Figure 5:
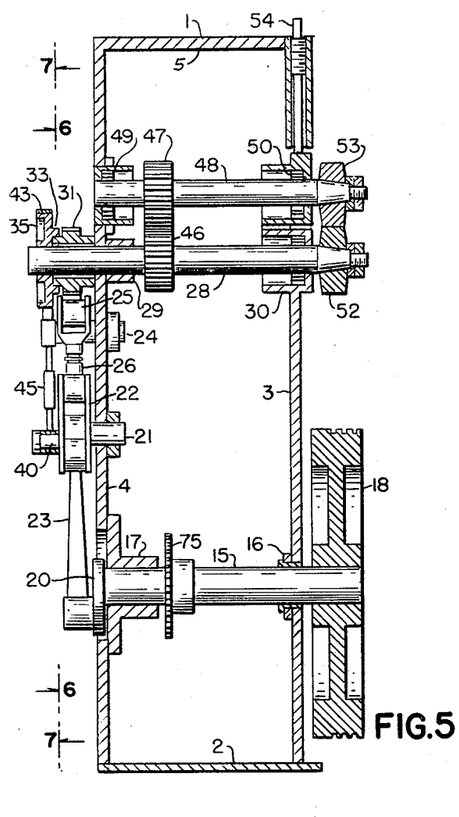
FIGURE 5 is a section taken on line 5—5 of FIGURE 1 showing the intermittent drive for the wire forming rollers.
Figure 6:
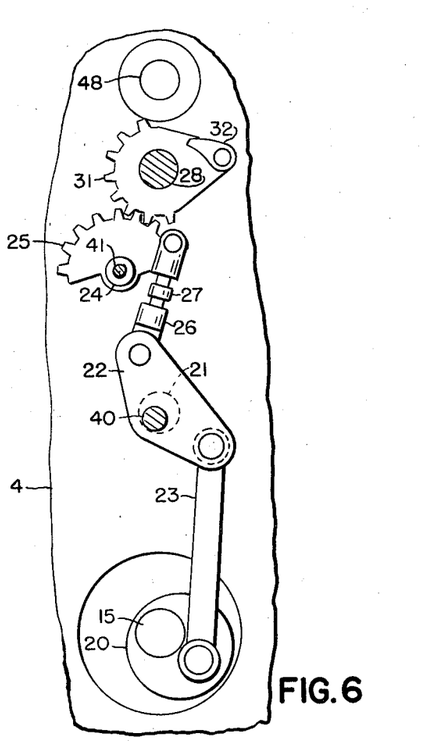
FIGURES 6 and 7 are, respectively, sections taken on line 6—6 and 7—7 of FIGURE 5.

Referring now to FIGURES 1, 5, and 6, a main shaft 15 is journalled in suitable bearings 16 and 17 mounted, respectively, on front and rear walls 3 and 4. A heavy pulley and flywheel 18 is mounted on shaft 15 to be driven by V-belts 19 by a motor (not shown). The rear end of shaft 15 has a crank 20 mounted thereon. A pin 21 is fixed to wall 4 and has a link 22 rotatably mounted on it. Connecting rod 23 extends from crank 20 to link 22 so that rotation of shaft 15 oscillates or rocks link 22 about pin 21. A pin 24 is fixed to project from wall 4 and has a sector gear 25 mounted on it. A second connecting rod 26 connects the upper end of link 22 with one side of sector gear 25 to oscillate it. The second connecting rod 26 is adjustable in length by turning a central element 27.

Figure 7:
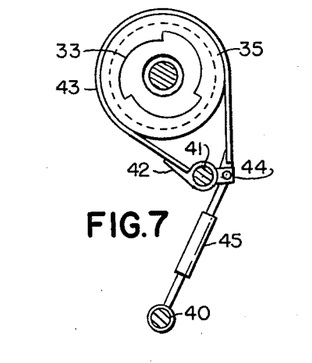
Figure 8:
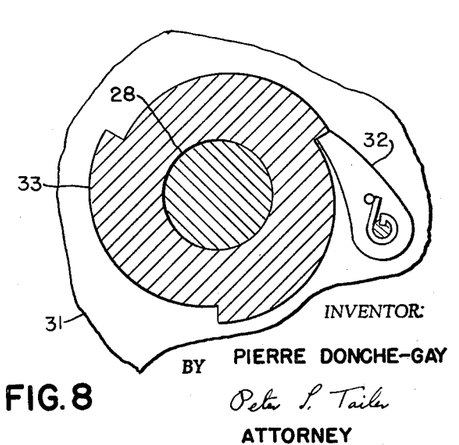
FIGURE 8 is a vertical transverse section through a rachet driven roller shaft showing elements mounted thereon.
Figure 9:
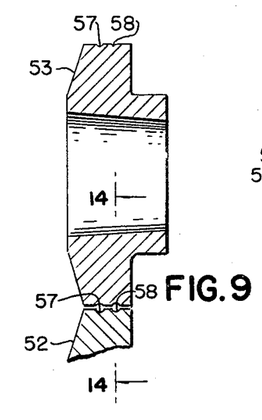
FIGURE 9 is a longitudinal, axial section through one wire forming roller and a fragment of a co-acting roller.
Figures 10, 11, 12, 13:
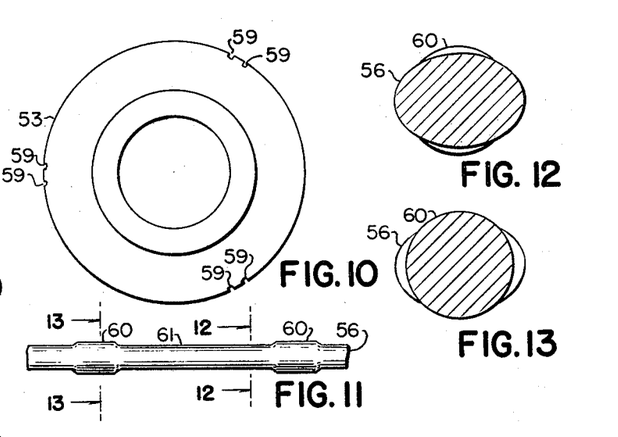
FIGURE 10 is a back view of a wire forming roller.
FIGURE 11 is a side view of a fragment of main strand wire formed by the barbed wire machine of my invention.
FIGURES 12 and 13 are, respectively, sections taken on lines 12—12 and 13—13 of FIGURE 11.

A first roller shaft 28 is journalled in bearings 29 and 30 fixed to walls 4 and 3, respectively. A second sector gear 31 is rotatably mounted on shaft 28 behind rear wall 4 to mesh with sector gear 25. Sector gear 31 has a spring biased pawl 32 mounted on it to engage a ratchet wheel 33 as shown in FIGURE 8. Ratchet wheel 33 is integrally formed on the front side of brake drum 35 which is fixed to shaft 28. Thus an oscillation of more than 120 degrees of sector gear 31 causes pawl 32 to drive shaft 28 with intermittent rotations of 120 degrees. Referring now to FIGURES 5, 6, and 7, an eccentrically mounted pin 40 extends rearwardly from link 22. Pin 24 has a further smaller diameter rearward extension 41 to one end of which a yoke 42 fixes brake band 43. The other end of brake band 43 is fixed to a pivotal link 44 also mounted on extension 41. An adjustable connecting rod 45 extends from eccentric pin 40 to link 44. Thus, as link 22 pivots counterclockwise as shown in FIGURE 6, causing pawl 32 to drive shaft 28, brake band 43 is applied to brake drum 35 to absorb inertia of shaft 28 and other rotating elements to limit rotation of shaft 28 to 120 degrees.

Figure 2:
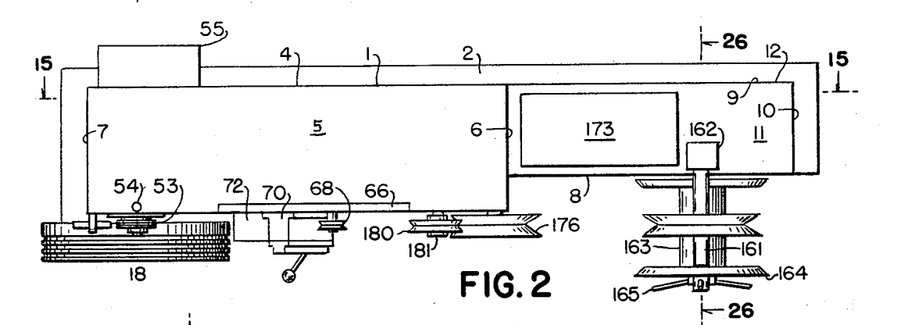
Figure 3:
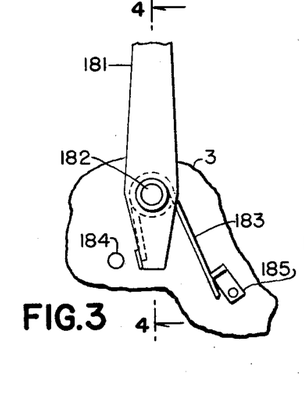
FIGURE 3 is an enlarged front view of a fragment of the front of the barbed wire machine showning a spring activated take-up arm.
Figure 4:
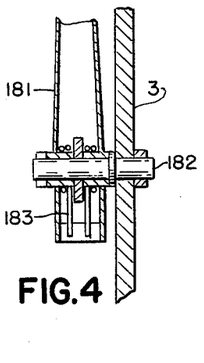
FIGURE 4 is a view taken on line 4—4 of FIGURE 3.

A rear cover 55, shown in FIGURE 2, protects an operator from the hereinbefore described intermittent drive elements.

Figures 14, 15:
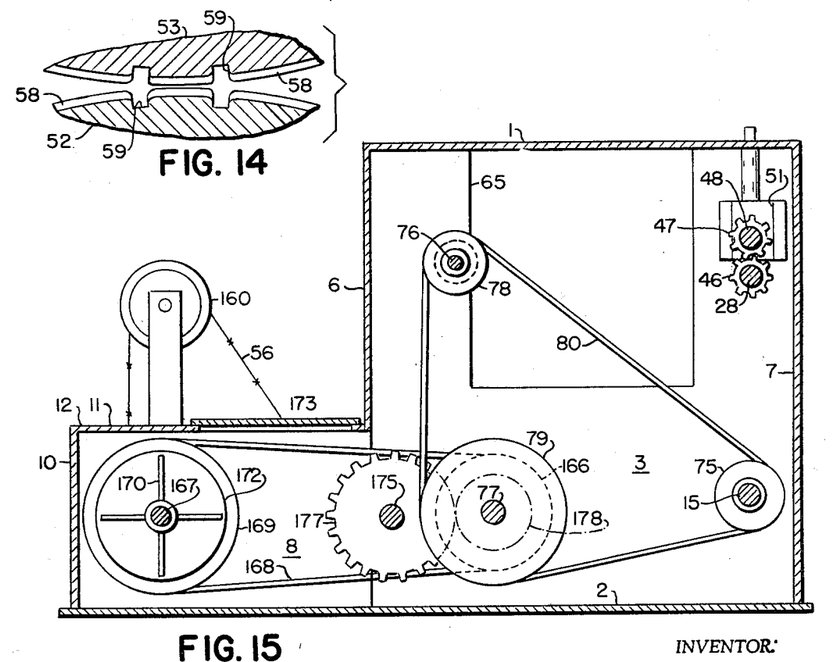
FIGURE 14 is a section taken on line 14—14 of FIGURE 9.
FIGURE 15 is a vertical section taken on line 15—15 of FIGURE 2 showing drive means within the barbed wire machine of my invention.

Referring now to FIGURES 5 and 15, shaft 28 carries gear 46 which meshes with gear 47 mounted on shaft 48. Shaft 48 has its rear end journalled in the spherical roller bearing 49 fixed to wall 4. The front end of shaft 48 is journalled in the spherical roller bearing 50 which is vertically slidably mounted between the ways 51. The wire forming rollers 52 and 53 are mounted on the forward ends of the shafts 28 and 48 in front of wall 3. A threaded adjustment rod 54 is screwed downward on bearing 50 to adjust the clearance between the wire forming rollers 52 and 53. The spherical roller bearings 49 and 50 allow shaft 48 to have its alignment changed to accomplish this adjustment.

Referring now to FIGURES 9-14, the rollers 52 and 53 co-act to feed and form the main strand 56 of the barbed wire being manufactured. A strand of line wire of round cross section passes between a corresponding pair of circumferential grooves 57 or 58 to flatten the wire 56 and make it oval in section for the major distance between barbs. Two sets of grooves 57 and 58 are provided so that when one set is worn, the wire 56 may be switched to the other to double the life of the rollers 52 and 53. Three pairs of longitudinal grooves or deeper notches 59 in the circumference of the rollers 52 and 53 allow the circular cross section of the wire 56 to remain at closely spaced portions 60 which define a section 61 of wire 56 about which barbs are to be wound. The circular portions 60 contain the wound barbs on both sides to prevent them from sliding axially while the oval or elliptical section 61 stops barbs wound thereon from rotating about main strand 56.

The rollers 52 and 53 are synchronized in their rotation by the identical gears 46 and 47 so that the pairs of notches 59 correspond. The rollers 52 and 53 are also set on shafts 28 and 48 in a position to stop the sections 61 of wire 56 in a desired location to have barbs wound thereon as will be hereinafter described. Fine adjustments of the dwell position of the sections 61 may be made by turning central element 27 of the adjustable connecting rod 26 shown in FIGURE 6. Thus it may be seen that the rollers 52 and 53 draw main strand wire through them, form the main strand wire, and, being constantly in contact with the main strand wire, index or position it longitudinally for barb winding. While 120 degree rotation of the rollers 52 and 53 containing three pairs of notches 59 has been shown, any number of pairs of notches 59 may be provided on rollers intermittently rotated through a corresponding number of degrees. Thus if two pairs of notches 59 were provided, the rollers would be intermittently rotated through 180 degrees.

As shown in FIGURES 1 and 15, front wall 3 contains a large rectangular opening 65 within which a main casting assembly 66 is fixed by suitable bolts 67. Fixed to the front of the main casting assembly are the pulleys 68 about which barb wires 69 are directed. Also fixed on the front of the assembly 66 are the two barb wire feed roller assemblies 70, the barb wire guides 71, the bard winding head 72, and the barb cut-off knives 73.

Referring to FIGURE 15, main shaft 15 has a sprocket 75 mounted thereon. Shafts 76 and 77 are rotatably mounted in machine frame 1 and have sprockets 78 and 79 mounted on them so that, by means of a chain 80, main shaft 15 drives shafts 76 and 77.

Figure 16:
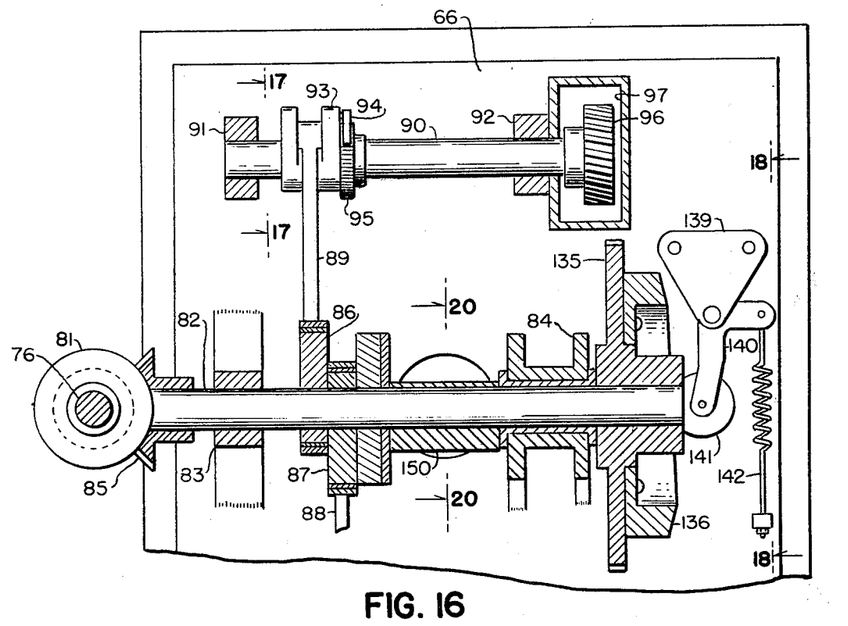
FIGURE 16 is a rear view, partly in section, of the broken away upper portion of the main casting assembly showing the barb wire drive shaft and one intermittently driven barb feed drive shaft.

As shown in FIGURE 16, shaft 76 has a bevel gear 81 monuted on it. Assembly 66 has a main barb wire drive shaft 82 journalled in integrally cast bearings 83 and 84. Bevel gear 85 meshes with gear 81 when assembly 66 is fixed on machine frame 1 to drive the entire assembly 66 and all the elements mounted thereon. Thus assembly 66 is a self-contained unit which may easily be replaced or removed as desired. It is to be noted that shaft 82 must make one revolution for each revolution of the main drive shaft 15.

Figures 17, 18, 19:
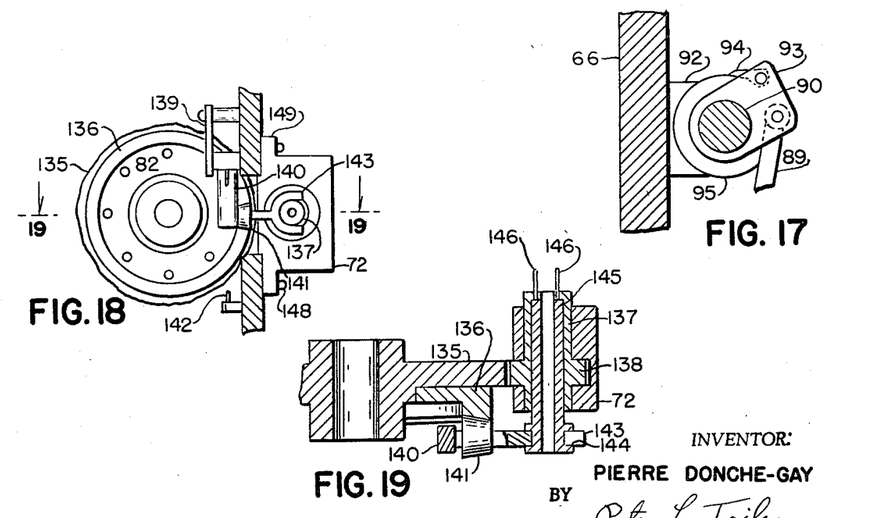
FIGURE 17 is a section taken on line 17—17 of FIGURE 16.
FIGURE 18 is a section taken on line 18—18 of FIGURE 16.
FIGURE 19 is a section taken on line 19—19 of FIGURE 18.
Figure 20:
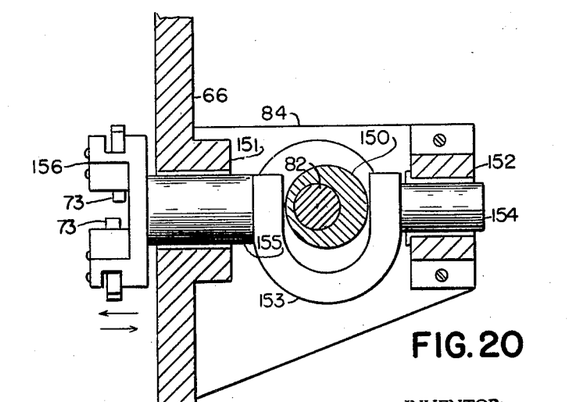
FIGURE 20 is a section taken on line 20—20 of FIGURE 16 with the cam operated knives shown in position.

Referring further to FIGURE 16, two eccentrics 86 and 87 on shaft 82 activate the connecting rods 88 and 89. Referring additionally to FIGURE 17, an upper barb wire feed drive shaft 90 is rotatably mounted in integrally cast bearings 91 and 92. A yoke 93 is rotatably mounted on shaft 90 and carries the spring biased pawl 94 which engages the rachet wheel 95 fixed to shaft 90. Thus rotation of shaft 82 intermittently rotates shaft 90. In a like manner, a lower barb wire feed drive shaft (not shown) is simultaneously intermittently rotated. The end of shaft 90 has mounted thereon a helical spur gear 96 which extends through an opening 97 in assembly 66 to drive barb wire feed rollers as will now be described.

Figure 23:
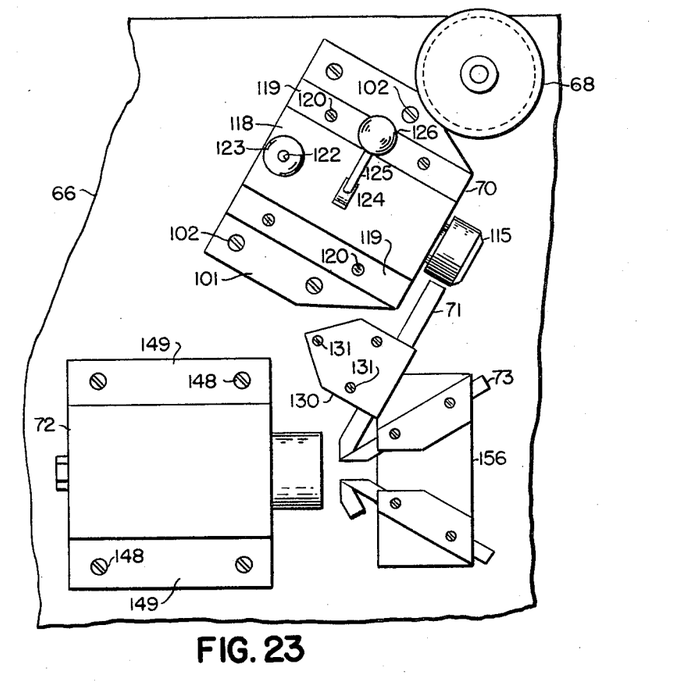
FIGURE 23 is an enlarged front view of a fragment of the main casting assembly having a barb winding head, a barb wire guide, a barb wire feed unit, a cut off knife, and a guide pulley mounted thereon.
Figure 24:
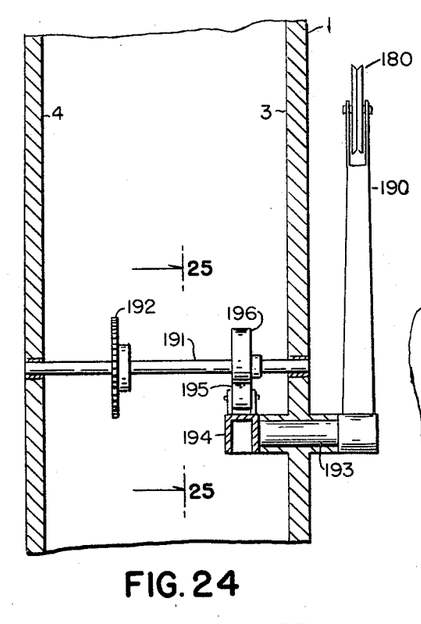
FIGURE 24 is a vertical transverse section through a fragment of a barbed wire machine showing a modification of an intermittent slack take-up unit.
Figure 25:
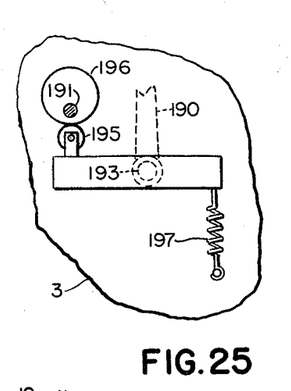
FIGURE 25 is a section taken on line 25—25 of FIGURE 24.
Figures 27, 28:
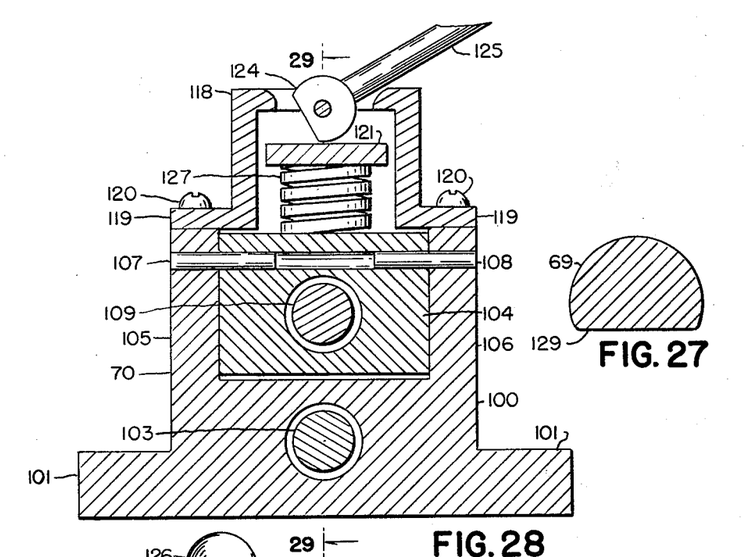
FIGURE 27 is a transverse section through a barb wire formed prior to winding by the barb wire feed rollers of my invention.
FIGURE 28 is a transverse section through an intermittent barb wire feed unit.
Figure 29:
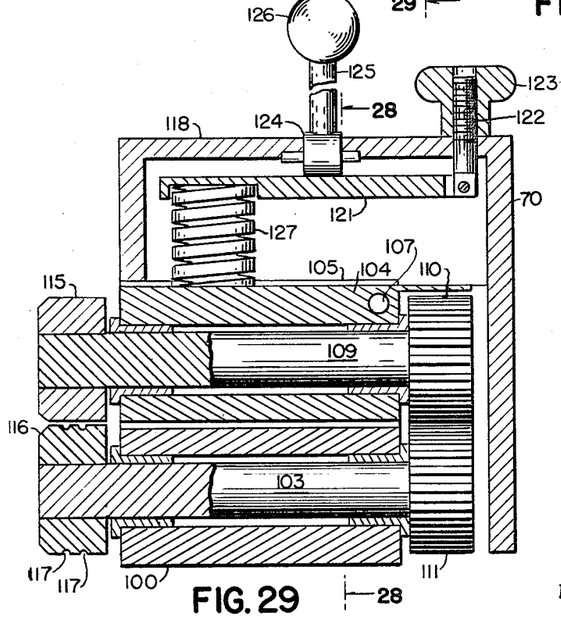
FIGURE 29 is a section taken on line 29—29 of FIGURE 28.

As shown in FIGURES 23, 28, and 29, the barb feed roller assemblies 70 each consist of a base 100 having side flanges 101 which are fixed to assembly 66 by bolts 102. A shaft 103 is journalled longitudinally in base 100 and carries a gear 111 at one end which is driven by the helical spur gear 96 shown in FIGURE 16. The helical spur gear 96 allows shafts 103 and 90 to be set at an angle to each other.

Referring further to FIGURES 23, 28, and 29, a shaft block 104 extends above base 100 and is pivotally mounted between the upstanding sides of base 100 by the pins 107 and 108. Shaft 109 is rotatably journalled in block 104 and carries the gear 110 which meshes with an identical gear 111. The shafts 103 and 109 of each assembly 70 carry a pair of rollers 115 and 116. One of these rollers has at least one circumferential groove 117 to guide a barb wire and assist in forming it.

A top cover 118 is fixed over the upstanding sides 105 and 106 of base 100 by screws 120 which pass through the flanges 119. A lever 121 is pivotally secured at one end by a threaded rod 122 which may be positioned by turning an internally threaded nob 123. A pivotally mounted central cam 124 may be activated by rod 125 and the attached nob 126 to force the center of lever 121 downward or release it. The other end of lever 121 bears down on a strong compression spring 127 which forces the intermittently driven rollers 115 and 116 together when cam 124 is in the position shown.

As shown in FIGURE 27, barb wire 69 has one side 129 flattened by the ungrooved roller 115 while the other side is not deformed as it is accommodated within a groove 117 of a roller 116. Flattened side 129 of each barb wire 69 contacts the section 61 of the main strand 56 about which it is wound. Flattened barb wire 69 is more easily wound as it has a lower bending moment.

Figure 21:
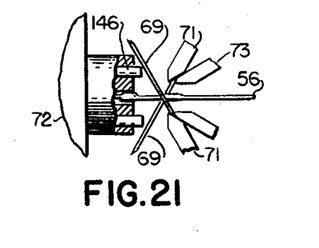
FIGURE 21 is a side view of a fragment of a barb winding head, partly broken away in section, with fragments of barb wire guides guiding barb wires to be wound about a main strand.
Figure 22:
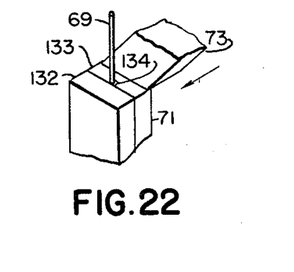
FIGURE 22 is a perspective view of the fragment of the end of a barb wire guide with a fragment of a knife shown in position moving to cut a barb wire.

Referring now to FIGURES 21, 22, and 23, the bard wire guides 71 are clamped in brackets 130 fixed to assembly 66 by screws 131. Each wire guide 70 has an upper bar 132 against which there is clamped an under bar 133 containing a longitudinal channel 134 to accommodate a barb wire 69 issuing from between a pair of rollers 115 and 116. As shown in FIGURE 21, the barb wires 69 extend on each side of wire 56 to be twisted or wound about it. The flat surface of each barb wire 69 should face strand 56.

Referring now to FIGURES 16, 18, and 19, a large gear 135 is mounted on shaft 82 and has a face cam 136 fixed to it. A hollow tubular spindle 137 is rotatably mounted in the barb winding head 72. A gear 138 is integrally formed on spindle 137 to mesh with th large gear 135 and be driven by it. Thus spindle 137 rotates several times during each rotation of gear 135.

A bracket 139 pivotally mounts arm 140 which has a cam follower roller 141 mounted on it. Spring 142 pivots arm 140 to urge roller 141 against face cam 136. Arm 140 has yoke 143 fixed to it to engage a circumferential groove 144 of a hollow tubular finger bar 145. Barb winding fingers 146 project from the front of finger bar 145 and extend through apertures in the front of spindle 137. Since cam 136 has one high portion, the fingers 146 rotate with spindle 137 and are projected and retracted in it once for each revolution of shaft 82.

As shown in FIGURE 21, fingers 146 would extend further to wrap the barb wires 69 about the main strand 56. As may be seen in FIGURES 18 and 23, the barb winding head 72 may be fixed to assembly 66 by bolts 148 which pass through flanges 149. If desired, head 72 may be cast integrally with assembly 66.

Referring now to FIGURES 16, 20, 22, and 23, an eccentric circular cam 150 is mounted on shaft 82. Bearings 151 and 152 slidably mount a yoke 153 by means of yoke shafts 154 and 155. A knife mounting plate 156 is fixed to the end of shaft 155 to support the cut-off knives 73. After barbs are wound, cam 150 moves the knives 73 outward or forward far enough to shear the barb wires 69 and free the wound barbs so they may be advanced with the next intermittent motion of main strand 56.

Figure 26:
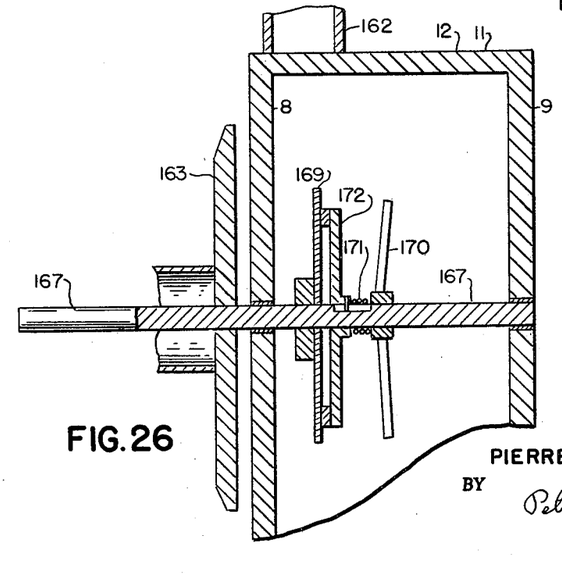
FIGURE 26 is a section taken on line 26—26 of FIGURE 2.

Referring now to FIGURES 1, 2, and 26, the extension 12 of frame 1 has a pulley 160 rotatably mounted on a shaft 161 projecting from a post 162. Pulley 160 is positioned over a barbed wire reel 163 which may have its outer flange 164 removed by backing off the hand wheel 165. Barbed wire packaging spools may be placed on reel 163 and removed when wound with barbed wire. A double right and left hand thread may be provided on shaft 161 with a suitable follower on pulley 160 to move it from side to side and evenly wind barbed wire 56 on reel 163.

As shown in FIGURES 15 and 26, shaft 77 has a sprocket 166 mounted on it to drive chain 168 and thereby sprocket 169 which is rotatably positioned on shaft 167 to which reel 163 is fixed. A hand wheel 170 may be screwed along shaft 167 to urge a compression spring 171 against clutch plate 172. Clutch plate 172, which is slidably fixed to rotate with shaft 167, thus bears against sprocket 169 to drive shaft 167 as a slip clutch. Drive torque may be varied by turning hand wheel 170 after removing inspection plate 173 shown in FIGURES 1 and 2.

Referring further to FIGURES 1, 2, and 15, a shaft 175 is mounted in machine frame 1 to have pulley 176 fixed to it in front of wall 3. Within frame 1 shaft 175 has a gear 177 mounted on it to be driven by a gear 178 mounted on shaft 77. Thus driven pulley 176 and the slip clutch driven wire reel 163 tend to draw wire 56 through winding head 72.

As shown in FIGURES 1–4, a take-up pulley 180 is mounted on arm 181. Arm 181 is pivotally mounted on pin 182 which is fixed to project from wall 3. Arm 181 is urged clockwise, as shown, by the springs 183 which are held by bracket 185. A stop 184 prevents excessive motion of arm 181. Since the wire 56 is advanced intermittently by rollers 52 and 53, the slack is taken up by arm 181 and pulley 180 to draw wire 56 smoothly through the winding head 72. This arrangement also allows the clutch 172 to operate with a minimum of slippage and wear as it need only rotate reel 163 at a rate of speed sufficient to wind up barbed wire at the average speed at which it is passed through rollers 52 and 53.

FIGURES 26 and 27 show a cam activated take-up arm 190 which is required for some higher speed operations. A shaft 191 is journalled in machine frame 1 and carries a sprocket 192. Sprocket 192 is driven by chain 80 and must be the same size as sprocket 75 on main shaft 18 so arm 190 will make one movement for each advance of a wire 56. Arm 190 is mounted on shaft 193 rotatably journalled in wall 3. A lever 194 is fixed to shaft 193 and has a cam follower roller 195 mounted on it. Roller 195 engages cam 196 to oscillate lever 194 and thereby arm 190 to take up slack as wire 56 is intermittently advanced. A spring 197 urges the cam roller 195 against cam 196.

The relative timing of the various functions of this barbed wire forming machine are as follows. Rollers 52 and 53 advance wire 56 through them for about 150 degrees of rotation of 360 degrees of rotation of main shaft 15. The barb wire feed rollers 115 and 116 begin to feed the barb wires 69 after the start of the advance of main strand 56 to allow the barb which was wound during the previous cycle to pass out of the way. The advance or feed of the main strand 56 and the barb wires 69 stops at about the same time. The winding fingers 146 are now sufficiently extended from the winding head 72 to engage and start winding the barb wires 69. The fingers 146 retract into the winding head 72 after the barb wires have been wound a desired number of turns about main strand 56. The knives 73 then move forward to shear the wound barb wires 69 and the cycle repeats itself.

While this invention has been shown and described in the best form known to me, it will nevertheless be understood that this is purely exemplary and that modifications may be made without departing from the spirit and scope of the invention except as it may be more limited in the appended claims wherein I claim:

1. A barb wire machine for the manufacture of single strand barbed wire having a main strand and barbs wound thereon comprising, in combination, a pair of wire forming rollers containing coacting circumferential grooves through which said rollers pass said main strand flattening said main strand and containing corresponding pairs of closely spaced axial notches formed across said circumferential grooves allowing said main strand to remain unflattened only within said notches to form pairs of closely spaced unflattened portions of said main strand, said coacting circumferential grooves of said rollers being in constant engagement with said main strand to positively advance said main strand with rotation of said rollers, means intermittently rotating said rollers an exact number of degrees to advance said main strand the distance from one pair of unflattened portions to the next, and means fixed on said barbed wire machine winding barbs on said main strand while stationary between the closely spaced unflattened portions of each pair.

2. The combination according to claim 1 with the addition of a frame of said barb wire machine having a base, front and rear walls upstanding from said base, side walls extending between said front and rear walls, and a top fixed over said front and rear walls and said side walls forming a substantially rectangular box-like structure, and with the addition of wire forming roller shafts rotatably mounted one above the other between said front and rear walls and extending beyond said front wall, said wire forming rollers being mounted on said wire forming roller shafts in front of said front wall, said front wall containing an opening, said means winding barbs on said main shaft being vertically mounted in said opening in said front wall adjacent to said wire forming rollers, said means intermittently driving said wire forming rollers driving said wire forming roller shafts.

3. The combination according to claim 2 wherein said means intermittently driving said wire forming roller shafts comprises a main drive shaft extending through said front and rear walls, a crank on said main drive shaft behind said rear wall, a pivotally mounted link above said crank mounted on said rear wall, a first connecting rod extending between said crank and said link oscillating said link, gears of the same size mounted on said wire forming roller shafts meshing with each other, a ratchet wheel fixed on one of said wire forming roller shafts behind said rear wall, an element rotatably mounted on one of said wire forming roller shafts adjacent to said ratchet wheel having a pawl engaging said ratchet wheel, and a second connecting rod connected to said link oscillating said element on said wire forming roller shaft so that said pawl intermittently drives said wire forming roller shafts.

4. The combination according to claim 3 wherein said second connecting rod is adjustable in length to finely index the rest position of said main strand in relation to said means winding barbs on said main strand.

5. The combination according to claim 4 with the addition of a first sector gear mounted on said rear wall, and wherein said element having said pawl is a second sector gear rotatably mounted on one of said wire forming roller shafts and meshing with said first sector gear, said second connecting rod connecting said link and said first sector gear oscillating said first and second sector gears.

6. The combination according to claim 5 with the addition of brake means on one of said wire forming roller shafts behind said rear wall, and an eccentric pin mounted on said link connected to said brake means, oscillation of said link applying said brake means rapidly stopping intermittent rotation of said wire forming rollers.

7. A barb wire machine for the manufacture of single strand barbed wire having a main strand and barbs wound thereon comprising, in combination, a box-like machine frame having front and rear walls, wire forming roller shafts extending between said front and rear walls and in front of said front wall, wire forming rollers mounted in front of said front wall on said wire forming roller shafts, meshing gears on said wire forming roller shafts within said machine frame synchronizing rotation of said wire forming rollers, a main driven shaft journalled in said front and rear walls, a crank on said main shaft behind said rear wall, means connected to said crank intermittently rotating said wire forming roller shafts, said front wall containing an opening, barb winding means fixed vertically in said opening in said front wall, said wire forming rollers at all times positively engaging said main strand to advance and position said main strand in relation to said barb winding means, a second shaft journalled in said front and rear walls adjacent to said opening in said front wall, said second shaft having a first bevel gear mounted thereon facing said front wall, said barb winding means having a rear mounted barb wire drive shaft having a second bevel gear thereon, said bevel gears meshing to drive said barb wire drive shaft and thereby said barb winding means, drive means within said machine frame driven by said main shaft rotating said second shaft actuating said barb winding means to wind barbs on said main strand while said main strand is at rest, a third shaft having a cam mounted thereon, means driving said third shaft from said main shaft, a pivotally mounted arm, a cam follower connected to said arm, said cam follower engaging said cam rocking said arm, wire reeling means constantly taking up formed single strand barbed wire, and a pulley about which formed barbed wire passes mounted on said arm taking up slack in said main strand as said main strand is intermittently advanced.

8. The combination according to claim 7 wherein said barb winding means has a winding head, a rotatably mounted hollow spindle within said winding head through which said main strand passes, a large gear on said barb wire drive shaft, a small gear on said spindle driven by said large gear rotating said spindle, a face cam on said large gear, slidably mounted fingers within said spindle which may extend from said spindle, a yoke activated by said face cam extending and retracting said fingers once for each revolution of said barb wire drive shaft, sets of barb wire feed rollers mounted above and below said winding head, said barb wire feed rollers flattening one side of the barb wires as they feed the barb wires, intermittent drive means activated by said barb wire drive shaft rotating said barb wire feed rollers extending barb wires to be wound by said fingers, and cut-off means activated by said barb wire drive shaft cutting off wound barbs.

References Cited

UNITED STATES PATENTS

| | | | |
|---|---|---|---|
| 293,538 | 2/1884 | Sunderland | 140—63 |
| 972,657 | 10/1910 | Smith | 140—64 |

CHARLES W. LANHAM, *Primary Examiner.*

L. A. LARSON, *Assistant Examiner.*